United States Patent [19]
Rosenthal

[11] Patent Number: 5,636,521
[45] Date of Patent: Jun. 10, 1997

[54] REFRIGERATION APPARATUS AND METHOD

[76] Inventor: Richard A. Rosenthal, P.O. Box 329, Fawnskin, Calif. 92333-0329

[21] Appl. No.: 288,570

[22] Filed: Aug. 10, 1994

Related U.S. Application Data

[63] Continuation-in-part of Ser. No. 208,291, Mar. 10, 1994, abandoned.

[51] Int. Cl.$^6$ .................................. F25B 5/00; F25B 41/06
[52] U.S. Cl. .................................. 62/117; 62/498; 62/527
[58] Field of Search .................................. 62/DIG. 2, 117, 62/527, 498

[56] References Cited

U.S. PATENT DOCUMENTS

| | | | |
|---|---|---|---|
| 3,710,586 | 1/1973 | Maudlin | 62/498 X |
| 4,094,169 | 6/1978 | Schmerzler | 62/498 |

*Primary Examiner*—William E. Wayne
*Attorney, Agent, or Firm*—Walter A. Hackler

[57] ABSTRACT

Refrigeration apparatus and method generally include a compressor for compressing refrigerant gas to a liquid, an evaporator for evaporating refrigerant liquid to refrigerant gas and cooling in atmosphere adjacent the evaporator and a condenser for rejecting the heat of compression of hot refrigerant vapor to the atmosphere adjacent to the condenser. First and second chambers are provided separated by free-floating piston for alternately condensing refrigerant gas in the first chamber and storing refrigerant livid in the second chamber, and condensing refrigerant gas in the second chamber and storing refrigerant livid in the first chamber. Lines interconnecting the compressor, evaporator, condenser and the first and second chambers of the gas piston cylinder enable the compressor to alternately introduce refrigerant gas into the first chamber and move refrigerant livid into the evaporative means by displacement of the free-floating piston and introduce refrigerant gas into the second chamber and move refrigerant liquid into the evaporator by first displacement of the free-floating piston.

19 Claims, 1 Drawing Sheet

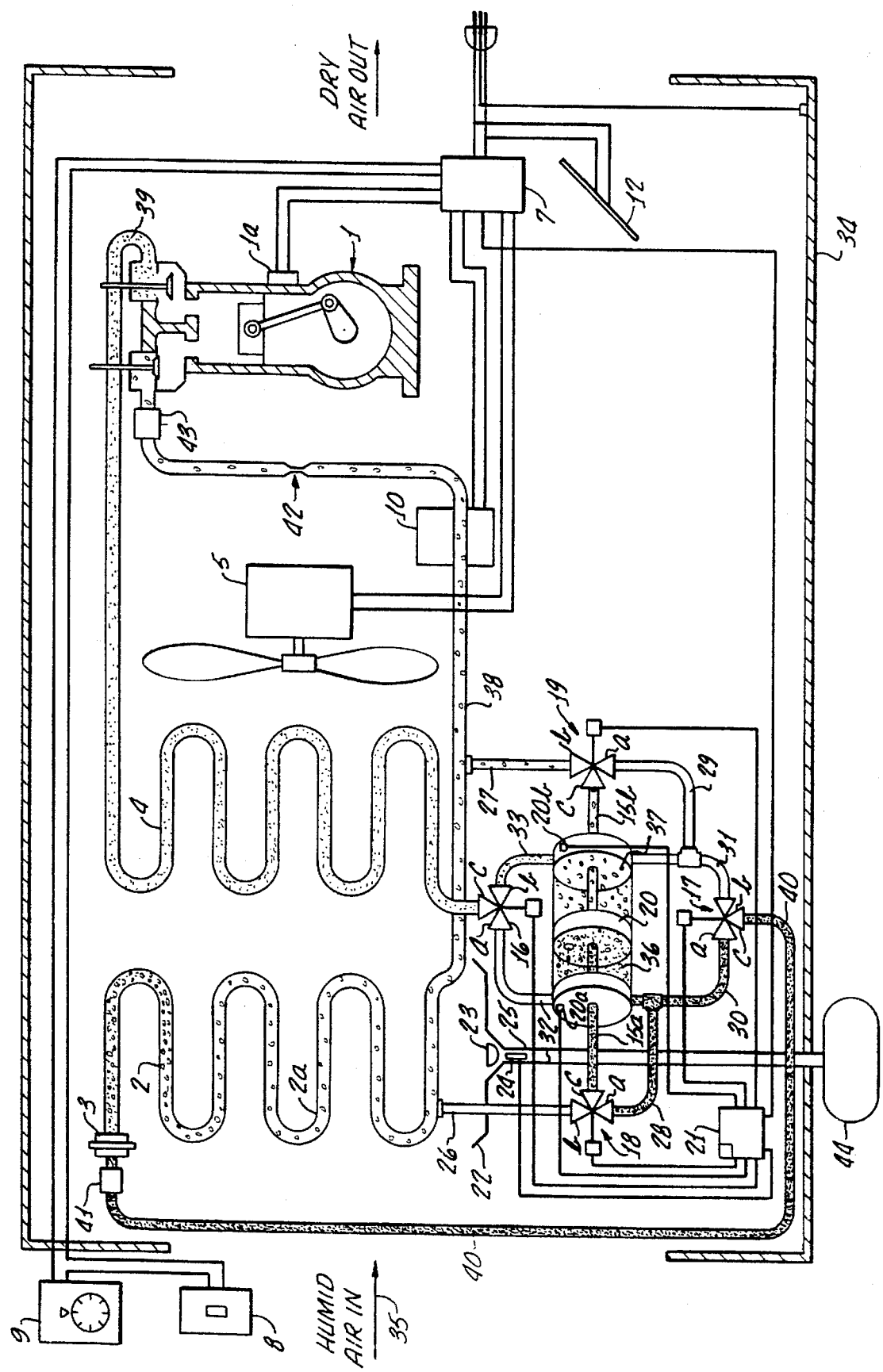

REFRIGERATION APPARATUS AND METHOD

The present application is a continuation-in-part of U.S. Ser. No. 08/208,291 filed Mar. 10, 1994 now abandoned.

The present invention is generally directed to refrigeration apparatus and more particularly directed to refrigeration apparatus useful for the efficient extraction of water from an ambient atmosphere.

The basic principles of refrigeration are derived from the behavior of a suitable fluid when it changes its state from liquid to gas or from gas to liquid.

Compressing a gas causes its temperature to rise, and if its temperature is then reduced without reducing the pressure, the gas will liquify. On the other hand, reducing the pressure of liquified gas will make it vaporize, i.e., boil.

The usefulness of these effects to refrigeration lies in the fact that any changes of a fluid between its liquid and gaseous states requires the transfer of latent heat to or from the fluid. In the case of the change from liquid to gas, latent heat must be supplied in order to provide the necessary energy for the change, and when the gas is liquified, this latent energy is released.

A refrigeration cycle may be defined as any system that takes heat at a lower temperature and rejects it at a higher temperature. In such a refrigeration system, the working fluid, or refrigerant, is evaporated in the evaporator and latent heat is drawn from the atmosphere ambient to the evaporator. Refrigerant then passes through a condenser unit spaced apart from the evaporator where it is condensed back to a liquid. Condensing the refrigerant releases its latent heat, which is the heat it absorbed in the evaporator, and so as the cycle continues, the refrigerant removes heat from the atmosphere ambient the evaporator and releases it from the condenser to the surrounding atmosphere.

When utilized as a gaseous atmospheric water extractor, refrigeration apparatus causes condensation to accumulate on the surface of the evaporator which also serves as a precipitator as the surrounding air is lowered below is dew point temperature. With this application, accumulated moisture may be utilized for life support.

The present invention includes a hydraulic refrigeration cycle in which heat is absorbed from an evaporator, except that high pressure vapor from the condenser is introduced against the face of a free-floating gas piston inside a hermetically sealed gas piston solenoid. The pressure of the gas exerted against the piston confines the liquid refrigerant on the opposite side of the piston to liquid phase.

When all the liquid refrigerant has been introduced into the evaporator, the piston reverses itself and the cycle is repeated. A portion of the refrigerant in the liquid phase is always introduced into the interior of a hollow piston via a hollow shaft on both sides of the piston where it is throttled from the liquid to the gaseous phase via an expansion valve.

This latent heat evaporization supercools the refrigerant inside the gas piston thereby reducing the temperature, heat of the compression, of the gas exposed to the compression side of the compressor. The lower temperature compounded with limiting the critical volume of the refrigerant in the liquid phase substantially reduces the energy input to the compressor by up to thirty percent.

SUMMARY OF THE INVENTION

Refrigeration apparatus in accordance with the present invention generally includes compressor means for compressing a refrigerant gas to a liquid and evaporative means for evaporating refrigerant liquid to refrigerant gas and cooling an atmosphere adjacent the evaporative means. Condensing means are provided for the partial rejection of the heat of compression of the hot refrigerant in the vapor phase to the atmosphere.

Chamber means are provided which include a free-floating hollow piston separated into chamber means into a first and a second chamber as provided for alternately a) condensing refrigerant gas in the first chamber and storing refrigerant liquid in the second chamber, and b) condensing refrigerant gas in the second chamber and storing refrigerant liquid in the first chamber.

Additionally, means are provided which include lines interconnecting the compressor means, the evaporative means, the condensing means, and the first and second chambers for enabling the compressor means to alternately a) induce refrigerant gas into the first chamber and move refrigerant liquid into the evaporative means by displacement of the free-floating piston, and b) introduce refrigerant gas into the second chamber and move refrigerant liquid into the evaporative means by reverse displacement of the free-floating piston.

More particularly, the present invention may include means for cooling the chamber means and specifically the means for cooling the chamber means may include a fan for passing the cooled atmosphere adjacent the evaporative means over the compressor and chamber means.

In accordance with one embodiment of the present invention, means may be provided for collecting water condensing on the evaporator means from the adjacent atmosphere.

In addition, the free-floating piston means may include expansion valve means for throttling a liquid refrigerant into the hollow piston in order to supercool the piston.

The advantages of the present invention lie in the fact that the latent heat vaporization of a refrigerant gas is most effectively utilized by using the gas piston cylinder as a liquid receiver and secondary condenser and the evaporator as the precipitator.

Preferably, in view of environmental concerns, the present invention utilizes propane for the refrigerant gas since the environmental effects of this hydrocarbon are negligible inasmuch as the gas is not classified as a toxic chlorofluorocarbon.

A method of refrigeration in accordance with the present invention generally includes the steps of compressing refrigerant gas to a liquid and introducing the liquid into a first sealed chamber having as one wall thereof a hollow movable piston in order to compress the refrigerant gas in a second sealed chamber by movement of the movable piston. Refrigerant gas compressed in the second chamber is withdrawn and introduced into an evaporator in order to vaporize the refrigerant.

The vaporized refrigerant is introduced into the second chamber.

Thereafter, the method of the present invention comprises compressing the refrigerant gas from the condenser to a liquid and introducing the liquid refrigerant gas into the second sealed chamber in order to compress the refrigerant gas in the first sealed chamber by movement of the movable piston.

BRIEF DESCRIPTION OF THE DRAWINGS

The present invention can be more easily understood by consideration of the following detailed description, particularly in conjunction with the accompanying drawing in which:

FIG. 1 is an engineering diagram of refrigeration apparatus in accordance with the present invention suitable for performing the method of the present invention.

DETAILED DESCRIPTION

Turning now to FIG. 1, there is generally shown refrigeration and atmospheric water extractor apparatus in accordance with the present invention, generally including a motor-driven compressor 1 which provides a means for compressing a refrigerant gas into a liquid and an evaporator 2 which provides means for evaporating refrigerant liquid into a refrigerant gas and cooling an atmosphere 35 adjacent to the evaporator 2.

Chamber means 13 is provided which includes a free-floating hollow piston 20 separating the chamber means 15 into a first sealed chamber 36 and a second sealed chamber 37. As hereinafter discussed in greater detail, the free-floating piston 20, with integral hollow shafts 15a, 15b, provides a means for alternately condensing the refrigerator gas in the first chamber 36 and storing liquid refrigerant in the second chamber 37 and thereafter condensing refrigerant gas in the second chamber 37 and storing refrigerant liquid in the first chamber 36.

A low pressure vapor line 38 interconnects the evaporator 2 and the compressor 1. Output from the compressor 1 is introduced via a high pressure line 39 into the condenser 4. Thereafter, liquid refrigerant from the condenser 4 is alternatively delivered through solenoid valve 16 and line 32 to the first chamber 36 or to the second chamber 37 through line 33 respectively.

The first chamber 36 is interconnected via line 30 through solenoid valve 17 and liquid line 40 to expansion valve 3. The second chamber 37 is also interconnected via line 31 to the liquid line 40 through the solenoid valve 17. The floating piston 20 is hollow and includes natural expansion valves because of the dramatic difference between the hollow shafts 15a, 15b, and the hollow piston 20 as represented in FIG. 1. This provides means for throttling liquid refrigerant into the hollow piston 20 . Movement of the hollow piston 20 and integral hollow piston shafts within the chamber means 13 is enabled via flexible high pressure lines 28 and 29 connected thereto and solenoid valves 18 and 19 respectively control flow through the flexible high pressure lines 28, 29 and integral hollow piston shafts, in order to supercool the piston 20. The low pressure vapor from the hollow piston shafts 15a and 15b is conducted through lines 26 and 27 via solenoid valves 18 and 19 to the evaporator 2 which includes a plurality of coils 2a. A motor-driven fan 5 is used to circulate air past the evaporator 2.

Filters 41, 43 are disposed in liquid line 40 and in vapor line 38 respectively in a conventional manner along with a pressure regulator 42. Each of the solenoid valves 16, 17, 18, 19 includes valves 16a, 16b, 16c, 17a, 17b, 17c, respectively, which along with valves 18a, 18b, 18c, 19a, 19b, 19c control the flow of the liquid refrigerant and gas in accordance with the present invention, with such a control system 21 being of modern computer design 21, and made in accordance to fulfill the steps of the present invention.

In one embodiment of the present invention, an accumulator (water drain) 22 disposed adjacent the evaporator 2 provides means for collecting water condensing on the evaporator 2 and conducting the accumulated water via a line 25 into a reservoir 44.

As shown in FIG. 1, lines 30, 31, 32, 33, directly connected to the chambers 36, 37, respectively, are interconnected to the compressor 1 and evaporator 2 via solenoid valves 16, 17, 18, 19.

In operation, liquid refrigerant under high pressure flows from the first chamber 36 through solenoid valve ports 17a, c via line 30 and into the liquid line 40 via filter drier 41 to the expansion valve 3 and into the evaporator 2.

Here, the pressure is greatly reduced and the liquid refrigerant boils and absorbs heat from the evaporator. A portion of the refrigerant in the liquid phase is simultaneously introduced into the interior of the hollow shaft 15a and piston 14, via lines 30 and 28 through solenoid valve ports 18a, c. Inside the piston 20, the pressure is greatly reduced, the refrigerant boils and absorbs heat from the refrigerant in the liquid phase in the first chamber 36, supercooling it; while significant heat is simultaneously absorbed from the hot, compressed refrigerant vapor in the second chamber 37 of the chamber means 13. The refrigerant, now a vapor, exits through the hollow shaft 15b and returns to the suction line 38 to the compressor 1, through solenoid valve ports 19c, b and line 27. At this point, the refrigerant vapor in the second chamber 37 undergoes a phase change to the liquid phase. The critical volume of the second chamber 37 always inhibits the refrigerant from returning to the vapor phase by virtue of the piston 20 and its temperature.

Now, a low pressure refrigerant flows back to the compressor 1 through the line 38 and is compressed to the high pressure vapor with a greatly increased temperature.

When the gas piston 20 has traversed the length of the chamber means 14, the liquid refrigerant in the second chamber 37 is recirculated back to the evaporator 2 via solenoid valve ports 17b, c and the cooling cycle is repeated. The cooling cycle is reversed when the contacts 20c and 20d on the front and rear surfaces of the piston 20 trigger either magnetic switch 20a or 20b in the first 36, or second 37, chamber of the gas piston cylinder means 13. Contact closures are sensed and acted upon by the microcontroller system 21 which activates or deactivates the appropriate solenoid valves 16, 17, 18, 19. System power is engaged by switch 8; humidity control 9, air flow, frost, and motor control 7 functions are sensed and acted upon by the microcontroller system 21 for processing this information to monitor and control the atmospheric water extractor.

When used as a gaseous atmospheric water extractor, the evaporator 2 along with the water drain (accumulator) 22, ultraviolet lamp 24, water filter 23, and reservoir 44 provides potable water.

When used as a portable facility, a miniaturized compressor 1 may be driven by a motor 1a which may be fueled by propane or electrically driven, such as, for example, a solar array 12.

Calculations have shown that propane is a suitable refrigerant gas while newly-developed replacements for freon refrigerants, such as those developed by Dupont, may also be utilized Regarding the use of the apparatus as a gaseous atmospheric water extractor utilizing propane, it has been found that to remove 6 ounces of moisture/hour from the atmosphere at 70° F. and 40% relative humidity at a flow rate of 200 CFM, a sensible heat of 5940 BTU/hour and a latent heat of 3762 BTU/hour, or 9612 BTU/hour must be removed. The normalized latent heat of vaporization for propane is 160 BTU/hour. The heat of compression is 04 BTU/hour. Therefore, to extract 6 ounces/hour, a ¼ HP motor is required. To accomplish this, an input of 2,360,000 BTU/hour is required to power the compressor. A 4.2 ft. by 4.2 ft. solar cell array is used to generate the necessary 688 KW/hour to power the 24 VDC at 8 Amp motor to recompress the liquified propane 72,000 times/hour. The critical volume of propane at standard temperature and pressure is 8.5 cu. ft./lb.

The range of atmospheric conditions for which the present apparatus is operable is any point above freezing at a relative humidity (RH) of not less than 10%. The higher the ambient temperature and RH, the more moisture can be extracted. Doubling the flow rate doubles the amount of moisture extracted, which doubles the amount of energy required. This required energy is minimized by re-using the cold, dry dehumidified air from the evaporator to partially cool the condenser 4, gas piston cylinder 14, compressor 1, and motor 1a by a counter-current heat exchange initiated by the evaporator 2.

Propane as the working fluid is preferred since it represents the best compromise between impact on the environment, availability, cost, toxicity, latent heat of vaporization, critical volume, and minimum pressure for liquification.

Although there has been hereinabove described specific arrangements of refrigeration apparatus and methods therefor for the purpose of illustrating the manner in which the present invention can be used to advantage, it should be appreciated that the invention is not limited thereto. Accordingly, any and all modifications, variations, or equivalent arrangements, which may occur to those skilled in the art, should be considered to be within the scope and spirit of the present invention as defined by the appended claims.

What is claimed is:

1. Refrigeration apparatus comprising:
   compressor means for compressing a refrigerant gas to a liquid;
   evaporation means for evaporating refrigerant liquid to refrigerant gas and cooling an atmosphere adjacent the evaporation means;
   condensing means for rejecting the heat of compression of hot refrigerant vapor to the atmosphere adjacent to the condenser;
   chamber means, having a free-floating piston separating said chamber means into a first chamber and a second chamber, for alternately
   (a) condensing refrigerant gas in the first chamber and storing refrigerant liquid in the second chamber, and
   (b) condensing refrigerant gas in the second chamber and storing refrigerant liquid in the first chamber; and
   means, including lines interconnecting the compressor means, the evaporation means, the condensing means and the first and second chambers, for enabling the compressor means to alternately
   (a) introduce refrigerant gas into the first chamber and move refrigerant liquid into the evaporation means by displacement of the free-floating piston, and
   (b) introduce refrigerant gas into the second chamber and move refrigerant liquid into the evaporation means by reverse displacement of the free-floating piston.

2. The refrigeration apparatus according to claim 1 further comprising means for cooling said chamber means.

3. The refrigeration apparatus according to claim 2 wherein the means for cooling said chamber means comprises fan means for passing the cooled atmosphere adjacent the evaporator means over the chamber means.

4. The refrigeration apparatus according to claim 3 further comprising means for collecting water condensing on the evaporator means for the adjacent atmosphere.

5. The refrigeration apparatus according to claim 3 wherein the refrigerant gas comprises propane.

6. The refrigeration apparatus according to claim 5 further comprising electric motor means for driving the compressor means.

7. The refrigeration apparatus according to claim 5 further comprising propane motor means for driving the compressor means.

8. The refrigeration apparatus according to claim 7 further comprising solar panel means for driving said electric motor means.

9. The refrigeration apparatus according to claim 1 wherein the free-floating piston is hollow and comprises expansion valve means for throttling the liquid refrigerant gas into the hollow piston in order to supercool the piston.

10. A method of refrigeration comprising the steps of:
    compressing a refrigerant gas to a liquid;
    introducing the liquid into a first sealed chamber having as one wall thereof a hollow movable piston in order to compress refrigerant gas to a liquid in a second sealed chamber by movement of the movable piston;
    withdrawing liquid compressed in the second chamber;
    introducing the withdrawn liquid from the second chamber into an evaporator in order to vaporize the liquid from the second chamber;
    compressing the vaporized refrigerant from the evaporator to a liquid;
    introducing the liquid refrigerant gas into the second sealed chamber in order to compress refrigerant gas in the first sealed chamber by movement of the movable piston.

11. The method according to claim 10 further comprising the step of cooling the first and second chambers.

12. The method according to claim 11 wherein the step of cooling the first and second chambers comprises passing air cooled by evaporation of compressed refrigerant over the first and second chambers.

13. The method according to claim 10 further comprising the step of throttling liquid refrigerant inside of the hollow piston for supercooling thereof.

14. Refrigeration apparatus for extracting water from ambient atmosphere, the apparatus comprising:
    compressor means for compressing a refrigerant gas to a liquid;
    evaporation means for evaporating refrigerant liquid to refrigerant gas and cooling an atmosphere adjacent the evaporation means;
    condensing means for rejecting the heat of compression of hot refrigerant vapor to the atmosphere adjacent to the condenser;
    chamber means, having a free-floating hollow piston separating said chamber means into a first chamber and a second chamber, for alternately
    (a) condensing refrigerant gas in the first chamber and storing refrigerant liquid in the second chamber, and
    (b) condensing refrigerant gas in the second chamber and storing refrigerant liquid in the first chamber;
    means, including lines interconnecting the compressor means, the [evaporator]evaporation means, the condensing means and the first and second chambers, for enabling the compressor means to alternately
    (a) introduce refrigerant gas into the first chamber and move refrigerant liquid into the evaporation means by displacement of the free-floating piston, and
    (b) introduce refrigerant gas into the second chamber and move refrigerant liquid into the evaporation means by reverse displacement of the free-floating piston;

means for cooling said chamber means, said last-mentioned means comprising a fan disposed at a position for passing atmosphere adjacent the evaporation means over the chamber means; and means for collecting water condensing in the evaporation means from the adjacent atmosphere.

15. The refrigeration apparatus according to claim 14 wherein the free-floating piston is hollow and comprises expansion valve means for throttling the liquid refrigerant gas into the hollow piston in order to supercool the piston.

16. The refrigeration apparatus according to claim 15 wherein the refrigerant gas comprises propane.

17. The refrigeration apparatus according to claim 16 further comprises an electric motor means for driving the compressor means.

18. The refrigeration apparatus according to claim 16 further comprising a propane engine means for driving the compressor means.

19. The refrigeration apparatus according to claim 17 further comprising solar panel means for driving said electric motor means.

* * * * *